June 28, 1955

C. M. HINES

2,712,104

SPEED RESPONSIVE ACCELERATION CONTROL
FOR MOTORS OF DIESEL ELECTRIC DRIVES

Filed April 27, 1951

INVENTOR.
Claude M. Hines
BY
Frank E. Miller
ATTORNEY

June 28, 1955

C. M. HINES 2,712,104

SPEED RESPONSIVE ACCELERATION CONTROL
FOR MOTORS OF DIESEL ELECTRIC DRIVES

Filed April 27, 1951

INVENTOR.
Claude M. Hines
BY
Frank E. Miller
ATTORNEY

Fig. 3

INVENTOR.
Claude M. Hines
BY
Frank E. Miller
ATTORNEY

United States Patent Office 2,712,104
Patented June 28, 1955

2,712,104

SPEED RESPONSIVE ACCELERATION CONTROL FOR MOTORS OF DIESEL ELECTRIC DRIVES

Claude M. Hines, Verona, Pa., assignor to Westinghouse Air Brake Company, a corporation of Pennsylvania Application April 27, 1951, Serial No. 223,319

31 Claims. (Cl. 318—97)

This invention relates to propulsion control apparatus for vehicles such as railway cars and trains of the diesel-electric type.

The usual diesel-electric equipment comprises one or more diesel engines each of which drives a main generator which in turn supplies current to a plurality of traction or propulsion motors which drive corresponding vehicle wheel units.

In the past years several transition control methods have been used for automatically controlling the speed of the propulsion motors. One method is to use axle-driven generators to deliver a direct-current voltage proportional to the speed of the train, to operate a number of voltage-responsive relays which effect the desired speed propulsion control with the picking-up and dropping-out of said relays at certain different speeds respectively. This method is described in my prior Patent No. 2,361,099, assigned to the same assignee as this present invention.

It is an object of my present invention to provide an improved speed-change or transition control system in which the number of transition control steps exceeds the number of voltage-responsive relays.

It is another object of my present invention to provide an improved propulsion control system of the type indicated in the foregoing paragraph characterized by an arrangement including a number of voltage-responsive relays arranged in a novel manner such that individual relays operatively function at a certain train speed to effect one control operation and at a different train speed to effect another control operation by means rendering the relay operatively responsive to different voltages corresponding to the different train speeds.

It is another object of my present invention to provide a propulsion control apparatus of the type directly responsive to the speed of the vehicle, characterized by a novel arrangement for automatically causing different degrees of shunting of the traction motor fields in accordance with the speed of the vehicle to effect speed-change control operation.

It is still another object of my invention to provide a propulsion control apparatus which is directly responsive to the speed of the vehicle, said apparatus comprising in part a plurality of relays energized by axle-driven generators and arranged such that the point of pick-up and drop-out of said relays is uniformly critical due to a novel arrangement of reducing the load on said axle-driven generator at the low transition speed.

It is another object of my invention to provide a propulsion control apparatus of the type mentioned in the previous object characterized by a novel arrangement for insuring a positive proper sequencing of transition steps.

It is another object of my invention to provide propulsion control apparatus which is directly responsive to the speed of the vehicle, said apparatus comprising in part an axle-driven generator of the alternating current type and a plurality of relays arranged in a novel manner whereby different relays are utilized at different speeds.

It is also an object of my invention to provide an improved automatic propulsion control system for diesel-electric trains, utilizing axle-driven generators of the alternating current type and voltage-responsive control relays wherein a novel means is provided for causing the control relays to pick-up and drop-out at a substantially uniform voltage within a narrow speed range so as to provide a desired transition operation uniformly within a narrow speed range.

The above objects and other objects of my invention which will be made apparent hereinafter are attained in the embodiments of my invention hereinafter to be described and shown in the accompanying drawings, wherein Figs. 1 and 2 when taken together constitute a diagrammatic view of one embodiment of my improved propulsion control apparatus utilizing an axle-driven generator of the direct-current type.

While the vehicle propulsion control apparatus is shown in the drawings in simplified form for the purpose of illustrating the nature and utility of my novel control system, it will be understood that the systems illustrated and described herein may be applied to and function with various other conventional and complete propulsion or power apparatus.

Figure 2:
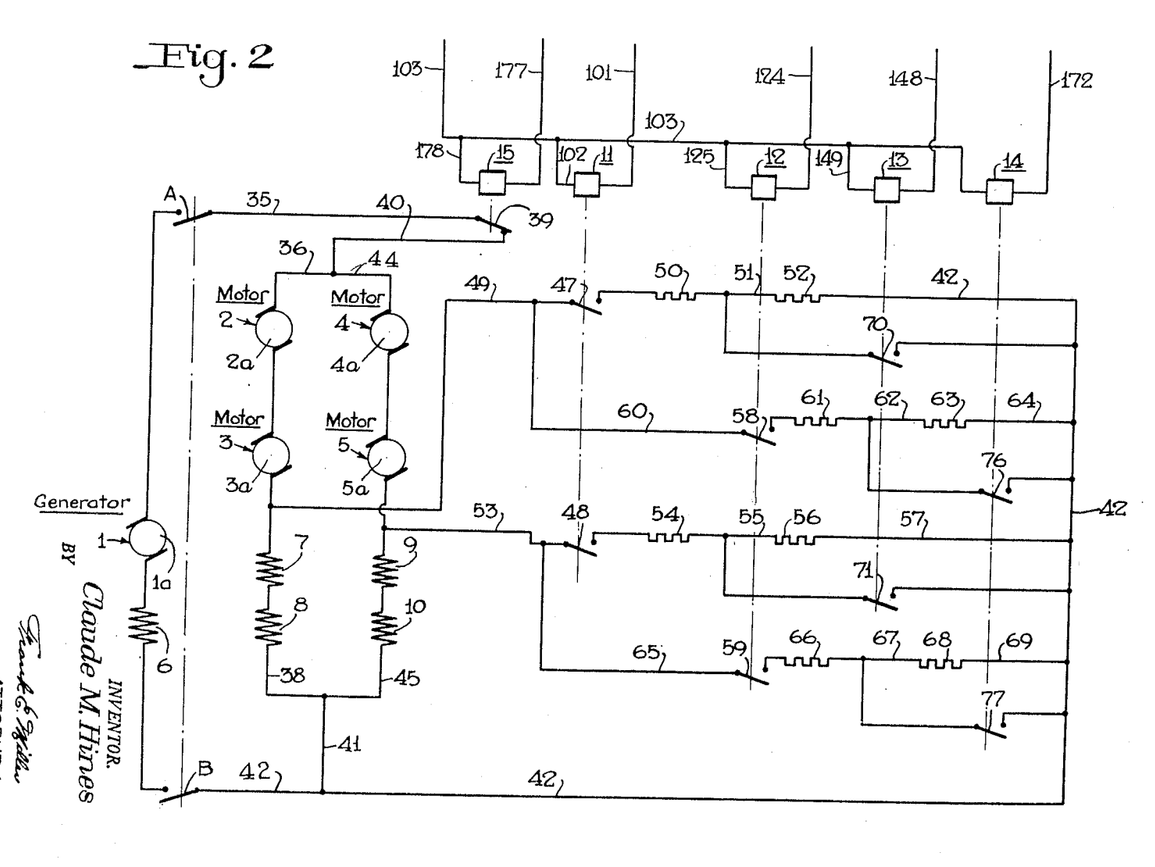

The simplified vehicle propulsion apparatus shown in Fig. 2 is represented by a generator 1 which in the case of the diesel-electric trains is driven by a diesel engine (not shown), said generator 1 supplying the power to operate the traction motors 2, 3, 4 and 5 which in turn propel the train through the medium of gears (not shown) or similar power transmitting device. Generator 1 is shown as comprising an armature winding 1a and a series field coil 6. The traction motors 2, 3, 4 and 5, have series field coils 7, 8, 9 and 10, and armature windings 2a, 3a 4a and 5a respectively.

Utilization relays 11, 12, 13, 14 and 15, hereinafter described, control various circuits for shunting the field coils 7, 8, 9 and 10 of the traction motors in such a manner as to obtain the desired tractive effort and speed of the traction motors within the voltage operating range of the generator 1. As will be explained presently, this shunting operation is so effected that maximum tractive effort is obtained from the traction motors 2, 3, 4 and 5 when the train is moving at low speeds. As is characteristic of series motors, the motor torque or tractive effort will be high when the motor field resistance is high, and as the field resistance decreases the motor torque or tractive effort decreases, thus to obtain maximum tractive effort at low train speeds and decreasing tractive effort at high train speeds, the motor field resistance is lowered according to my invention by means of the automatic shunting operation described hereinafter.

Figure 1:
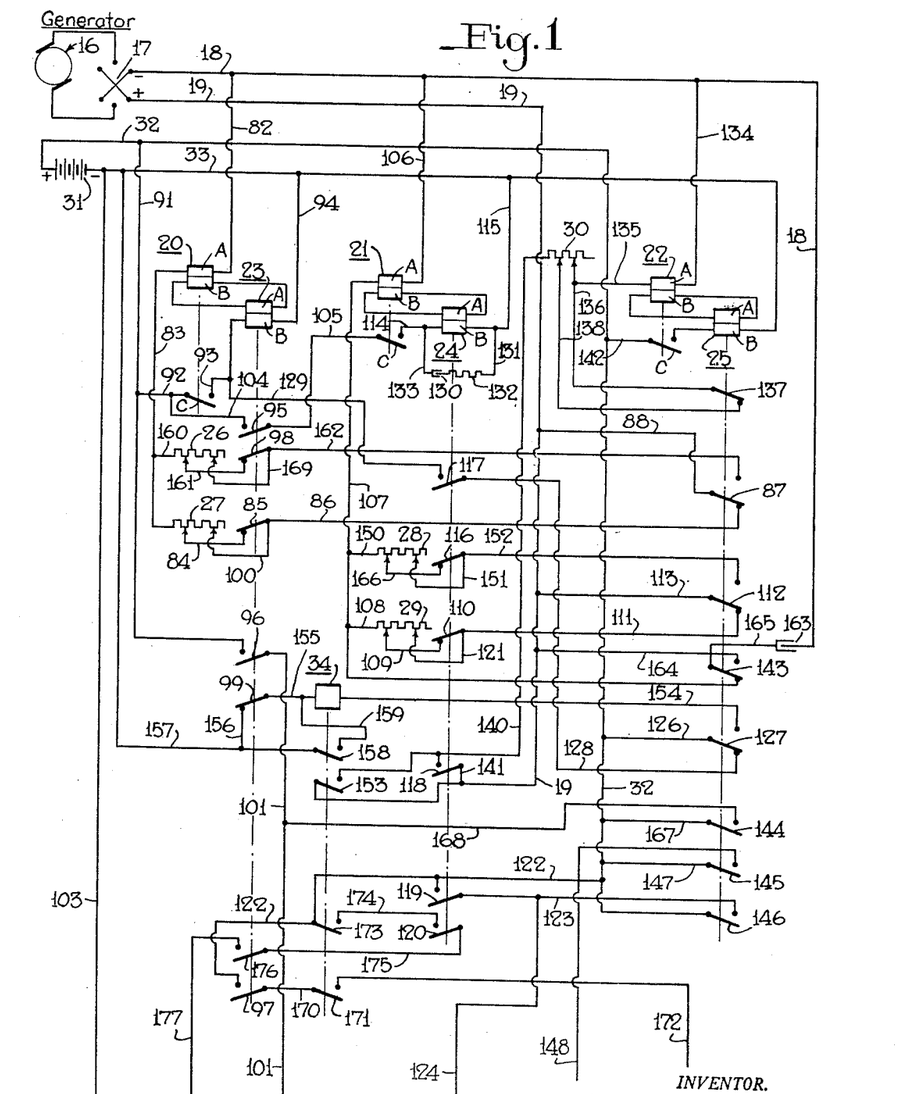

The control system shown in Fig. 1 consists of an axle-driven generator 16, of the direct-current permanent magnet field type, mounted in any suitable manner and arranged to be driven according to the rotation of a wheel unit (not shown) other than a driving unit so as to deliver a voltage substantially proportional to the linear speed of the train at all times.

This system further includes three voltage-responsive control relays 20, 21 and 22, and three repeater control relays 23, 24 and 25, respectively controlled by the relays 20, 21 and 22. These relays are all of the uni-directional type, that is, operatively responsive only to flow of energizing current through the windings thereof in one certain direction, due to the fact that relays of this type possess the characteristic that the point of pick-up and drop-out is uniformly critical. Relays 20, 21 and 22 are energized by voltage delivered by generator 16 over bus wires 18 and 19. In view of the fact that the polarity of the voltage delivered by generator 16 reverses with reversal of rotation of the wheels, a reversing switch 17 is provided for automatically maintaining uniform polarity of the voltage across bus wires 18 and 19 and thus ensure proper polarity of voltage at all times to operate the relays 20, 21 and 22. Switch 17 may be of any suitable automatic type, such as that disclosed in my previously mentioned Patent 2,337,717. For purposes of the present invention, it will be assumed that the bus wire 18 is always of negative polarity and that the bus wire 19 is always of positive polarity.

Each of the so-called speed relays 20, 21 and 22 comprises an upper winding A and a lower winding B and a single front contact member C.

The winding A of the relay 20 is arranged to be connected across the bus wires 18 and 19 alternatively in series with either of two resistors 26 or 27, or a portion thereof, by circuits to be traced presently. Likewise, the winding A of the relay 21 is arranged to be connected across the bus wires 18 and 19 alternatively in series with either of two resistors 28 and 29, or a portion thereof, by circuits discussed presently, and the relay 22 is arranged to be connected across the bus wires 18 and 19 alternatively in series with the resistor 30, or a portion thereof, by circuits described hereinafter.

A source of direct current voltage, such as a battery 31, is connected to the system by a battery supply wire 32 and a battery return wire 33. Repeater relays 23, 24 and 25 are energized upon connection across the battery wires 32 and 33 by way of circuits which will be traced hereinafter. A relay 34 is also energized by connection across the battery wires 32 and 33 in a manner to be described presently.

Figure 3:
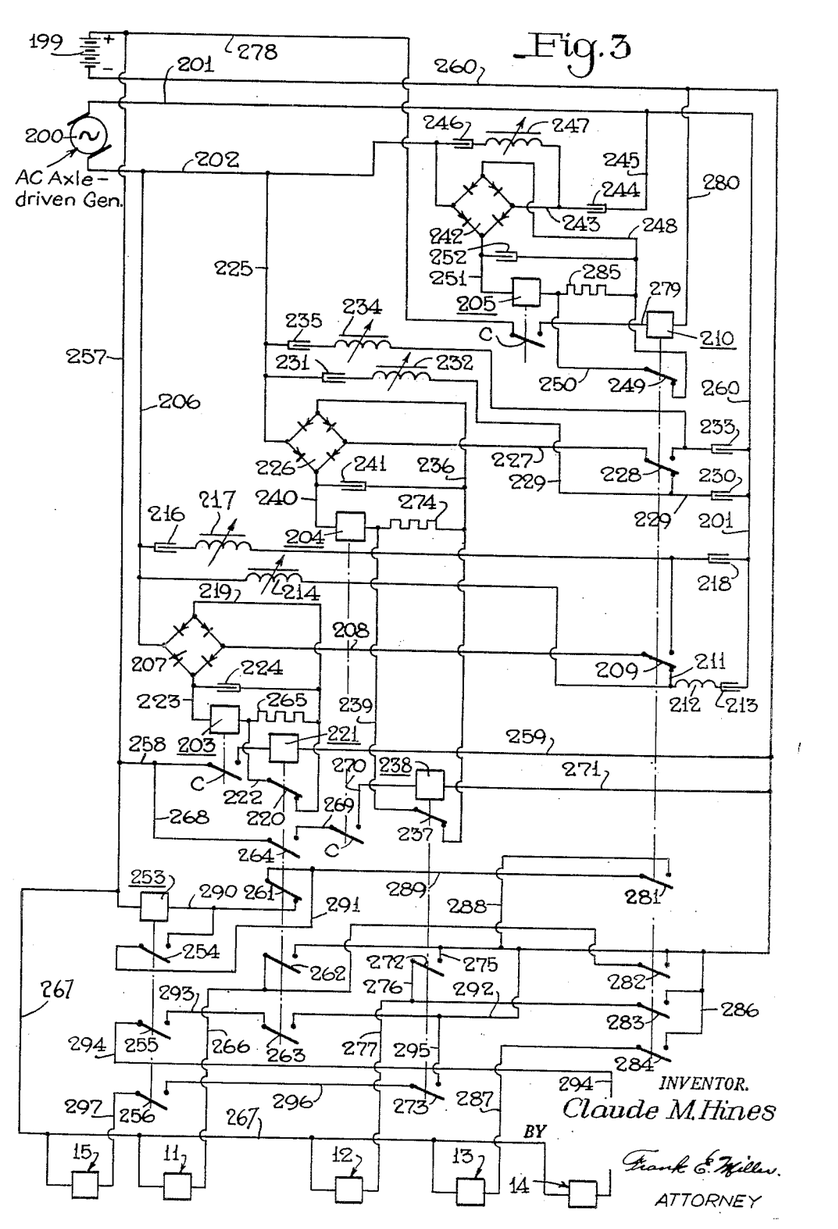
Fig. 3 is a diagrammatic view of another embodiment of my improved propulsion control apparatus utilizing an axle-driven generator of the alternating-current type.

Operation of the portion of the control system shown in Fig. 1 or Fig. 3 controls the operation of the portion shown in Fig. 2. For simplicity of description the portion shown in Fig. 1 and Fig. 3 will hereinafter be described as the control portion and the portion shown in Fig. 2 will be identified as the shunting portion.

In reference to the shunting portion, the utilization relays 11, 12, 13, 14 and 15 when energized in a manner and sequence to be explained in detail hereinafter, will operate the shunting portion as follows:

Let it be assumed that the train or vehicle is at a standstill and that the utilization relays 11, 12, 13, 14 and 15 are correspondingly deenergized. A two pole single throw starting switch comprised of switch arm A and switch arm B is closed to establish the supply circuit from the generator 1. With the said relays all deenergized, the generator 1 will supply electrical energy to the traction motors 2 and 3 by a circuit which may be traced from one terminal of the generator 1, by way of starting switch arm A, wire 35, contact member 39 of relay 15, wire 40, wire 36, armature winding 2a of the motor 2, armature winding 3a of the motor 3, series-connected field coils 7 and 8 of the motors 2 and 3, respectively, wire 38 and the parallel circuit including wire 44, armature winding 4a of motor 4, armature winding 5a of motor 5, series-connected field coils 9 and 10 and wire 45, to wire 41, wire 42, starting switch arm B, series field coil 6 of the generator 1 and the armature winding 1a of the generator 1 at the other terminal of generator 1.

It can thus be seen that the speed at which the Diesel engine (not shown) is driven, determines the speed and therefore the voltage supplied by the generator 1, which in turn determines the speed of the traction motors and thus the speed of the train. However, the speed of the traction motors can be varied independently of the generator voltage by shunting their respective field coils as will be explained.

When the train reaches the predetermined speed of 21 miles per hour as before mentioned, the relay 11 will automatically become energized to its picked-up position in a manner to be described hereinafter in discussion of the control portion. With the relay 11 energized to its picked-up position, the contact members 47 and 48 thereof are actuated to a picked-up or closed position. Contact member 47 of relay 11 is effective in its picked-up position to complete a first shunt circuit in parallel with the field coils 7 and 8 for shunting the field coils 7 and 8 of the motors 2 and 3. This said first shunt circuit is traced by way of wire 49, contact member 47 of relay 11, resistor 50, wire 51, resistor 52, wire 42, and wire 41. Contact member 48 is effective in its picked-up position to complete a second shunt circuit in parallel with the field coils 9 and 10 for shunting the field coils 9 and 10 of the motors 4 and 5 by way of wire 53, contact member 48 of relay 11, resistor 54, wire 55, resistor 56, wire 57, wire 42, and wire 41.

It can be noted, with these just mentioned circuits shunting the field coils of the traction motors, less current will be supplied to the field coils, and as is characteristic of these motors, this will in turn cause an increase in speed of rotation of the motors over the speed of rotation when the shunting circuits are not connected. It can be seen that any decrease in resistance of the shunt circuits of the field coils of the motors results in an increased amount of electrical energy being shunted away from the field coils, and will likewise result in an increase of rotational speed of the motors which is characteristic of these series motors.

When the speed of the train increases to a second predetermined speed, say 26 miles per hour, the relay 12 is energized to its picked-up position, as will be explained later, in which the contact members 58 and 59 thereof are closed. With the contact member 58 closed, the first branch circuit is thereby connected in parallel with the said first shunt circuit just described for the field coils 7 and 8. This said first branch circuit is connected between wire 49 and wire 42 and includes a wire 60, contact member 58 of relay 12, resistor 61, wire 62, resistor 63, and wire 64. Similarly, with the contact member 59 closed, a second branch circuit is thereby connected in parallel with the second shunt circuit just described for the field coils 9 and 10. This second branch circuit is connected between the wire 53 and wire 42 and includes a wire 65, contact member 59 of relay 12, resistor 66, wire 67, resistor 68, and wire 69.

Since the total resistance of the said first shunt circuit and the parallel said first branch circuit is of lower value than the resistance of the said first shunt circuit alone, more current will be shunted from field coils 7 and 8 when both relays 11 and 12 are energized, thereby causing the speed of motors 2 and 3 to further increase. In a similar manner, when both relays 11 and 12 are energized, the motors 4 and 5 will likewise increase their rotational speed by reason of a decreased total resistance in the circuits just described for shunting the field coils 9 and 10.

When the speed of the train further increases to a third predetermined speed, say 33 miles per hour, the relay 13 is energized (as will be explained) to its picked-up position in which the contact members 70 and 71 thereof are closed. Contact member 70 is effective in its closed position to shunt the resistor 52 in the said first shunt circuit. Similarly contact member 71 is effective in its closed position to shunt the resistor 56 in the said second shunt circuit.

With the shunting of resistor 52 in the said first shunt circuit by pick-up of relay 13, the total resistance of the said first shunting circuit in parallel with the said first branch circuit now is of lower value than when only relays 11 and 12 are energized. Therefore more current will be shunted from the field coils 7 and 8, thereby causing the motors 2 and 3 to further increase their speed of rotation. In a similar manner the speed of motors 4 and 5 will be greater when the relays 11, 12 and 13 are energized than when only relays 11 and 12 are energized, by reason of a decreased total resistance in the circuits just described for shunting the field coils 9 and 10.

When the speed of the train increases still further to a fourth predetermined speed, say 41 miles per hour, the relay 14 is energized to its picked-up position (as will be explained) in which the contact members 76 and 77 thereof are closed. Contact member 76 thus shunts the resistor 63 in the said first branch circuit. Similarly, contact member 77 shunts the resistor 68 in the said second branch circuit.

With the resistor 63 in the said first branch circuit shunted by pick-up of relay 14 the total resistance of the said first shunting circuit in parallel with the said first branch circuit is of lower value than when only relays 11, 12, 13 are energized. Thus more current will be shunted from the field coils 7 and 8, thereby causing the motors 2 and 3 to further increase their speed of rotation. In the similar manner, the speed of the motors 4 and 5 will be greater when the utilization relays 11, 12, 13 and 14 are energized than when only the relays 11, 12 and 13 are energized, by reason of a decreased total resistance in the circuit just described for shunting field coils 9 and 10.

These just described shunting circuits for train speeds above the predetermined speeds of 41 miles per hour will remain established until the speed of the train increases to the predetermind speed say 65 miles per hour at which time the relay 15 is energized to its picked-up position (as will be explained) in which the contact member 39 is open. With the contact member 39 open, the circuits previously described for supplying electrical energy to the traction motors 2, 3, 4 and 5 are opened, thereby rendering the traction motors incapable of transmitting any traction power to the driving wheels. Because of this safety feature of disconnecting the power supply to the traction motors at speeds in excess of a certain high speed, (in this case 65 miles per hour) the relay 15 is known as the over-speed relay. If so desired, it may be arranged that this same relay 15 may be energized to operate safety devices (not shown) such as magnet valves which will vent fluid under pressure from the brake pipe, or various other well-known over-speed devices which would initiate a brake application throughout the train.

After the relay 15 is energized and the disconnection of the traction motors has been effected, when the speed of the train drops below 65 miles per hour, the relay 15 is again deenergized (as will be explained), and the supply circuits of the traction motors reconnected by contact member 39 of relay 15.

When the train is reducing in speed (that is, from above 65 miles per hour to a standstill), this just described sequence for energization of the utilization relays 11, 12, 13 and 14 is reversed such that at speeds below a predetermined speed say 65, the relay 15 is again deenergized, and at speeds below a predetermined speed of say 38 miles per hour, the relay 14 is deenergized, and at speeds below a predetermined speed of 31 miles per hour, the relay 13 is deenergized, at speeds below a predetermined speed, say 24 miles per hour, the relay 12 is deenergized, and at speeds below the predetermined speed say 19 miles per hour the relay 11 is deenergized as will be explained in discussion of the control portion. Similarly, with this reverse sequence of energization of the relays, the respective shunting circuits described as the speeds increase will be disconnected in reverse order to that which they are connected with increasing speeds.

In reference to the control portion, as mentioned previously, the speed-responsive generator 16 provides a voltage substantially proportional to the speed of the rotation of the driving wheels, said voltage being supplied to the bus wires 18 and 19 through the reversing switch 17 which maintains the voltage to wire 18 constantly negative and the voltage to wire 19 constantly positive.

When the speed of the train is below a predetermined speed say 21 miles per hours as previously mentioned, the generator 16 supplies electrical energy to the bus wires 18 and 19, and from wire 18 to the top winding A of relay 20 by way of wire 82, the top winding A of relay 20, wire 83, a portion of resistor 27, a wire 84, the back contact member 85 of relay 23 in its down closed position, wire 86, front and back contact member 87 of relay 25 in its down closed position, and wire 88 to positive bus wire 19. At the same time generator 16 supplies current to the top winding A of relay 21 by way of wire 106, the top winding A of the relay 21, wire 107, wire 108, a portion of the resistor 29, wire 109, contact member 110 in its down closed position, wire 111, contact member 112 of relay 25 in its down closed position, and wire 113 to the positive bus wire 19. However, as long as the speed of the train is under the predetermined speed of 21 M. P. H., the voltage delivered by the generator 16 to the bus wires 18 and 19 and hence the relays 20 and 21, is insufficient to cause either relay 20 or 21 to be picked up. Therefore, under speeds of 21 M. P. H., the control portion of this equipment is positioned in its normal position as shown in Fig. 1 of the drawings.

When the speed of the train reaches the predetermined speed of 21 M. P. H., the voltage delivered by the generator 16 is sufficient to energize the winding A of the relay 20 to its picked-up position. This energization of top winding A of the relay 20 to its picked up position closes the front contact member C of the relay 20, thereby completing a circuit from the positive battery wire 32 to the negative battery wire 33 by way of wire 91, wire 92, the contact member C of relay 20, wire 93, the lower winding B of relay 23, and wire 94. The completion of this circuit energizes the lower winding B of the relay 23, thereby actuating that relay to its picked-up position, in which the front contact members 95, 96, 97 and 176 are closed and the back contact members 85, 98, and 99 are opened. The opening of the back contact member 85 serves to effect the insertion of an increased portion of the resistor 27 into the circuit described for energizing the top winding A of the relay 20 opening the circuit through the wire 84 and leaving only the wire 100 effective to complete the circuit. This increase in the amount of resistor 27 in the circuit for energizing the winding A of the relay 20 is for the purpose of assuring pick-up and drop-out of relay 20 at substantially the same speed, namely the predetermined speed of 21 M. P. H. This arrangement is well-known and is explained as follows:

The voltage necessary to pick up the relay 20 is greater than that required to maintain it picked-up. Therefore, as the voltage supplied by the generator 16 reduces with reduction of speed below 21 M. P. H. the relay would not drop out until the speed drops to approximately 10 M. P. H. without the insertion of additional resistance of the resistor 27 after the relay 20 has been picked-up.

Winding A of relay 23 is connected in a loop circuit with winding B of relay 20 so that the voltage momentarily induced in winding A of relay 23 when winding B of relay 23 is energized serves to energize winding B of relay 20, thereby assuring positive closing of contact member C of relay 20. Conversely the effect of this connection is to assure positive drop-out of contact C of relay 20 when winding B of relay 23 is deenergized. This feature is well-known.

With the speed above 21 M. P. H. and the contact member 96 closed as described previously, a circuit is completed from the battery supply wire 32 by way of wire 91, contact member 96 of relay 23, wire 101, winding of relay 11, wire 102, and wire 103 to the battery return wire 33, thereby energizing the relay 11 for a purpose described previously in the discussion of the shunting portion of the equipment.

Contact member 95 of relay 23 in its closed position establishes a connection from the negative battery wire 32, by way of wire 91, wire 92, wire 104, contact member 95 and wire 105 to the contact member C of relay 21 for a purpose hereinafter described.

The opening of the contact members 98 and 99 of relay 23 is of no consequence at this predetermined speed of 21 M. P. H., but at predetermined increased speeds is necessary as will be explained hereinafter.

As the speed of the train increases to a second predetermined speed of 26 M. P. H., the voltage delivered by the speed responsive generator 16 is of a value sufficient to energize the relay 21 to its picked-up position by way of a circuit from the negative bus wire 18 to the positive bus wire 19 as previously described. With this relay 21 picked-up, the contact member C of relay 21 will be closed, thereby completing a circuit, partly established as previously described, from the positive battery wire 32, wire 91, wire 92, wire 104, the closed contact member 95 of relay 23, wire 105, and contact member C of relay 21, to wire 114, the winding B of relay 24, and wire 115 to the battery return wire 33, thus energizing the relay 24 to a picked-up position. With relay 24 energized to a picked-up position the back contact members 116, and 110 are opened, and the front contact members 117, 118, 119 and 120 are closed. In accordance with the opening of contact member 110, the amount of the resistor 29 in the circuit for energizing relay 21 is increased by opening of circuit through the shunting wire 109, thus assuring drop-out of the relay at substantially the same speed at which the relay 21 was picked-up as was explained in reference to relay 20.

At the same time the winding B of relay 24 is energized, a condenser 130 is charged to supply voltage by a loop circuit in parallel with the said winding by way of wire 131, resistor 132, condenser 130, and wire 133, for a purpose described hereinafter.

The upper winding A of relay 24 and the lower winding B of the relay 21 are connected in series in a loop circuit for the purpose of assuring positive pick-up and positive drop-out operation of the contact C of the relay 21 in a manner similar to that explained previously in connection with the winding B of relay 20.

The contact member 119 of relay 24 is effective in its picked-up or closed position to complete a circuit from the battery supply wire 32 by way of wire 122, contact member 119, wire 123, wire 124, the winding of relay 12, wire 125, and wire 103 to the battery return wire 33, thus energizing the relay 12 to its picked-up position for the purpose previously described in the discussion of the shunting portion.

The closing of contact member 117 of relay 24 established another circuit for maintaining the relay 23 picked-up by way of the battery supply wire 32, wire 126, contact member 127 of the relay 25 in its down-closed position, wire 128, closed contact member 117 of relay 24, wire 129, wire 93, the lower winding B of relay 23, and wire 94 to the battery return wire 33. This circuit is established for the purpose of having the relay 24 govern the energization of relay 23 when the relay 20 is deenergized as will be made apparent hereinafter. The closure of contact member 118 of relay 24 places the relay 22 in the circuit of the generator 16 by way of wire 18, wire 134, winding A of relay 22, wire 135, wire 136, contact member 137 of relay 25 in its down closed position, wire 138, a portion of resistor 30, wire 140, contact member 118 of relay 24, and wire 141 to the wire 19. It must be noted however, that even though this circuit is completed to energize the relay 22, a voltage supplied through this circuit at speeds below the predetermined speed of 33 miles per hour is insufficient to cause the relay 22 to be picked-up.

The opening of contact member 116 and the closing of contact member 120 of the relay 24 is of no particular consequence at this time, but is necessary in further actions which will be presently described.

When the speed of the train reaches the predetermined speed of 33 miles per hour, the voltage delivered by the generator 16 is of a value sufficient to energize the relay 22 to its picked-up position by way of the circuit previously described for energizing relay 22, thus causing the contact member C of relay 22 to be picked-up to its closed position. In this closed position, the contact member C of relay 22 completes a circuit for energizing the winding B of relay 25 by way of the battery supply wire 32, wire 142, contact member C of the relay 22, the winding B of relay 25, and the battery return wire 33. Relay 25 is thus actuated to its picked-up position in which the back contact member 137 is opened and the front and back contact members 87, 112, 127 and 143 are shifted from the respective down-closed positions to their upper closed positions, and the front contact members 144, 145, and 146 are shifted to their closed positions.

The upper winding A of relay 25 and the lower winding B of relay 22 are connected in series in a loop circuit for the purpose of assuring positive pick-up and positive drop-out operation of the contact C of relay 22, in the manner similar to that explained previously in connection with the winding B of relay 21.

The changing of contact member 87 of relay 25 from its down closed position to its upper closed position establishes an alternate energizing circuit for winding A of relay 20 by substituting the wire 160, a portion of resistor 26, wire 161, contact member 98 in its closed position, and wire 162 for the resistor 27, wire 100, and wire 86 in the circuit for energizing winding A of relay 20. The resistor 26 is of larger resistance value than resistor 27 and thus the voltage drop across winding A of relay 20 is reduced to such an extent that the relay 20 returns to its dropped-out position, and remains dropped-out thereafter until the speed of the train increases further to a degree such that the voltage impressed on the winding A of the relay 20 is correspondingly increased to a degree such as will cause relay 20 to again be picked-up.

The changing of contact member 127 to its upper closed position interrupts the holding circuit previously described for energizing the relay 23, thus permitting relay 23 to drop-out.

The closing of contact member 144 of relay 25 substitutes a circuit from the battery supply wire 32, wire 167, contact member 144 of relay 25, wire 168, wire 101, winding of relay 11, wire 102, and wire 103 to the battery return wire 33 for maintaining relay 11 energized to its picked-up position, not-withstanding interruption of the circuit previously described for energizing relay 11 at contact member 96 of relay 23.

The opening of contact member 137 increases the portion of the resistor 30 in the circuit for energizing winding A of the relay 22, thus establishing the drop-out point at a speed substantially the same or slightly lower than the speed at which the relay 22 was picked-up in the manner previously explained in reference to relay 20.

The closing of contact member 145 when relay 25 is picked-up completes a circuit for energizing relay 13 of the shunting portion for the purpose previously described in the discussion of the shunting portion. This circuit may be traced by way of the battery supply wire 32, wire 147, contact member 145, wire 148, the winding of relay 13, wire 149, and wire 103 to the battery return wire 33.

The changing of contact member 112 of relay 25 from its down closed position to its upper closed position established an alternate energizing circuit for winding A of relay 21 by removing the wire 108, resistor 29, wire 121, and wire 111 from the circuit energizing winding A of relay 21 and substituting the wire 150, resistor 28, wire 151, and wire 152 in their stead. Resistor 28 is of larger resistance value than the resistor 29 and therefore relay 21 is dropped-out by reason of increased resistance in the circuit for energizing relay 21. As relay 21 drops out, the contact member C of relay 21 is opened thereby jointly with contact member 95 of relay 23 interrupting the circuit for energizing relay 24. The relay 24 does not drop out immediately however, due to the time delay provided by the discharging of the condenser 130 through the loop circuit previously described. This time delay is necessary for the purpose of holding the contact member 118 picked-up to maintain the circuit previously described for energizing the relay 22 until the relay 34 is energized to its picked-up position by circuits presently described, and thus picks-up the contact member 153 to maintain the circuit for energizing relay 22 after contact member 118 drops out. The circuit for energizing relay 34 is traced by way of the battery supply wire 32, wire 126, contact member 127 in its upper closed position, wire 154, the winding of relay 34, wire 155, contact member 99 in its closed position, wire 156, and wire 157 to the battery return wire 33. As soon as the relay 34 is picked-up and closes the contact members 153 and 158, the position of contact member 99 is of no consequence because the contact member 158 parallels contact member 99 and establishes a self-holding circuit for the winding of relay 34.

The changing of contact member 143 of relay 25 from its lower closed position to its upper closed position completes a circuit for charging the condenser 163 by way of wire 19, wire 164, contact member 143, wire 165, and condenser 163 to the wire 18 for a purpose explained hereinafter.

The closing of contact member 146 of relay 25 substitutes a circuit including a battery supply wire 32, contact member 146 of relay 25, wire 123, wire 124, the winding of relay 12, wire 125, and wire 103 to the battery return wire 33, for maintaining relay 12 energized to its picked-up position, since the circuit previously described for energizing relay 12 is interrupted with the opening of contact member 119 of relay 24.

It is thus seen that when the speed of the train reaches the predetermined speed of 33 miles per hour, the relays 11, 12 and 13 of the shunting portion will all be energized to their respecitve picked-up positions and relays 22, 25 and 34 of the control portion are in their respective picked-up positions.

When the speed of the train reaches the predetermined speed of 41 miles per hour, the voltage supplied from the generator 16 is sufficient to cause the relay 20 to be energized to its picked-up position by way of the alternate energizing circuit established by contact member 87 of relay 25, as previously described. This alternate circuit may be traced from the bus wire 18, the winding A of relay 20, wire 83, wire 160, and a small portion of resistor 26, wire 161, contact member 98 of relay 23, wire 162, contact member 87 of relay 25, and wire 88, to the bus wire 19. As the relay 20 is picked-up, the contact member C of relay 20 will close, thereby completing a circuit previously described for energizing the winding B of relay 23 to its picked-up position. With the picking-up of relay 23 and consequent opening of contact member 98, the small portion of resistor 26, wire 161, and contact member 98 in the circuit for energizing relay 20 will be replaced by a larger portion of resistor 26 and a wire 169 thereby assuring dropping-out of relay 20 at a speed substantially the same or slightly lower than picked-up speed for reasons previously explained in reference to relay 20.

With the relay 23 picked-up, the contact members 95, 96, 97 and 176 will be closed, and the contact members 98, 85 and 99 will be open. The closing of contact member 97 of relay 23 completes the circuit for energizing relay 14 to its picked-up position by way of the battery supply wire 32, wire 122, closed contact member 97 of relay 23, wire 170, closed contact member 171 of relay 34, wire 172, the winding of relay 14, and wire 103 to the battery return wire 33.

When the train reaches the predetermined speed of 65 M. P. H., the voltage delivered by the generator 16 is sufficient to cause relay 21 to be energized to its picked-up position by way of the previously described alternate energizing circuit established by contact member 112 of relay 25 at the time relay 25 was picked-up.

This alternate circuit may be traced from the bus wire 18 by way of wire 106, winding A of relay 21, wire 107, wire 150, a small portion of resistor 28, wire 166, closed contact member 116 of the relay 24, wire 152, contact member 112 of relay 25 in its upper closed position, and wire 113 to the bus wire 19. With contact member 95 of relay 23 closed in the picked-up position of the relay, contact member C of relay 21 is effective when closed in the picked-up position to establish a circuit previously described for energizing winding B of relay 24, thereby causing relay 24 to actuate its contact members to their respective picked-up positions.

In the picked-up or open position of contact member 116 of relay 24, the small portion of resistor 28 and wire 166 in the circuit for energizing relay 21 is replaced by a larger portion of resistor 28 and the wire 151, thus assuring drop-out of relay 21 at substantially the same train speed at which said relay was last picked-up, for a reason similar to that explained previously.

The closing of contact member 120 of relay 24 completes a circuit for energizing the winding of relay 15, which circuit extends by way of battery supply wire 32, wire 122, closed contact member 173 of relay 34, wire 174, closed contact member 120, wire 175, closed contact member 176 of relay 23, wire 177, the winding of relay 15, wire 178, and wire 103 to the battery return wire 33, thereby energizing relay 15 to its picked-up position, where, as explained in discussion of the shunting portion, the traction motor armature circuits are interrupted, thus stopping the traction motors until the speed of the train is slowed down to slightly below 65 M. P. H.— a speed at which relay 21 will drop-out, thus effecting de-energization of relays 24 and 15 in sequence.

The operation of the relays in this equipment during the just described progressive increase in train speed may be thus summarized as follows:

At speeds between 0 and 21 M. P. H., the relays 20 and 21 are energized, but not sufficiently energized to cause them to be picked-up. The remaining relays 22, 23, 24, 25 and 34 of the control portion, and relays 11, 12, 13, 14 and 15 of the shunting portion are not energized.

At speeds between 21 and 26 M. P. H., the relays 20 and 23 are picked-up; relay 21 is energized but not sufficiently enough to be picked-up; and the remaining relays 22, 24, 25, and 34 of the control portion are not energized, while in the shunting portion relay 11 is energized to its picked-up position, and the remaining relays are not energized.

At speeds between 26 and 33 M. P. H., the relay 20 is energized and picked-up, the relay 23 is energized and picked-up, relays 21 and 24 are energized and picked-up, the relay 22 is energized but not picked-up, the relays 25 and 34 are not energized, relays 11 and 12 are energized and picked-up, and relays 13, 14 and 15 are not energized.

At speeds between 33 and 41 M. P. H., the relays 20 and 21 are energized but not picked-up, over alternate energizing circuits other than those by which they were energized and picked-up at speeds between 26 to 33 M. P. H,. the relay 24 is energized and picked-up for only a short interval of time during which the condenser 130 discharges through a loop circuit, at which time the relay 24 is deenergized; relay 23 is deenergized, the relay 22 is energized and picked-up, relay 25 is energized and picked-up, relay 34 is energized and picked-up, relays 11, 12 and 13 are energized and picked-up, and relays 14 and 15 are deenergized.

At speeds between 41 and 65 M. P. H., the relay 20 is energized and picked-up over the alternate energizing circuit mentioned in the previous paragraph, relay 23 is energized and picked-up by the same circuit that it was energized by at speeds of 21 to 26 M. P. H., relay 21 is energized, but not picked-up, by the alternate circuit mentioned in the previous paragraph; relay 24 is deenergized, relays 22, 25 and 34 are energized and picked-up, relays 11, 12, 13 and 14 are energized and picked-up, and relay 15 is deenergized.

At speeds above 65 M. P. H., relays 20 and 21 are energized and picked-up over the alternate circuits mentioned in the previous two paragraphs and all the remaining relays are energized and picked-up.

Upon reduction in speed of the train, as by making a brake application, utilization relays 14, 13, 12 and 11 are deenergized in an order and sequence reversed from the above description for increasing train speeds with but one minor difference. As was previously mentioned, with speeds above 33 M. P. H., the condenser 163 was charged to the voltage delivered by the generator 16 at that speed. When the train speed is reduced below the speed of 33 M. P. H., relays 22 and 25 are dropped-out, thus causing the contact member 143 of relay 25 to assume its down-closed position, thus completing a circuit by which the condenser 163 may be discharged through winding A of relay 21 for aiding and assuring the pick-up of relay 21, which circuit may be traced from one terminal of condenser 163 by way of wires 18 and 106, the winding A of relay 21, wire 107, contact member 143 of relay 25 and wire 165 to the other terminal of condenser 163.

The second embodiment of my invention, shown in Fig. 3, includes a control portion differing from that in the embodiment shown in Figs. 1 and 2 in that it employs an alternating current system rather than a direct current system responsive to the train speed.

This embodiment serves to prevent possible variation in speed at which the transition steps take place, such as might occur due to changes in the ambient temperature when using a direct current generator system. In the direct current system the curve of voltage delivered by the direct current generator to the voltage-responsive relay as related to the speed of the train, varies with the ambient temperature and therefore the direct current generator may deliver different voltages for a given train speed when the ambient temperatures are different. Transition steps are thus not effective uniformly at the same speeds for different ambient temperatures. This embodiment causes transition steps to be effective uniformly at predetermined train speeds, regardless of variation in ambient temperature, by making use of an alternating circuit generator and relays which are made to respond to different frequencies of the voltage deliverd by the generator, said frequencies varying uniformly with the speed of rotation of said generator and thus the speed of the train, independently of variation in ambient temperature, as explained hereinafter.

Referring to Fig. 3, the embodiment of the invention shown therein comprises a control portion having a battery supply 199, and alternating current axle-driven generator 200 mounted similar to the generator 16 in Fig. 1 and connected to two bus wires 201 and 202. This embodiment also includes three detector relays 203, 204 and 205, of the direct-current type each having a contact member C, which are energized and picked-up (in a sequnce to be explained) by the current delivered by generator 200, which current is suitably rectified and selectively controlled through separate tuned circuits arranged to cause pick-up of the relays at different train speeds respectively.

The generator 200 delivers voltage to said tuned circuit at a frequency which varies with the speed of the train. The separate tuned circuits are tuned to resonance at different frequencies such that sufficient rectified voltage is delivered to said detector relays 203, 204, and 205 for effecting actuation thereof to their picked-up positions only above different specific train speeds respectively.

The tuned circuit used for energizing the relay 203 to its picked-up position extends from bus wire 202 by way of wire 206, a full wave rectifier 607, wire 208, a contact member 209 of a relay 210 (to be explained), a wire 211, a voltage limiting reactor 212, and a condenser 213, to bus wire 201, with a variable reactor 214 parallelling the rectifier 207. Inclusion of the variable reactor 214 and the condenser 213 in this circuit enables this circuit to be a tuned filter circuit for selectively controlling the current supplied to the rectifier 207. It can now be seen that as the speed of the train increases, the frequency of the voltage delivered by the axle-driven generator 200 increases proportionally and thus the tuning of the just described filter circuit selectively controls the current supplied to the rectifier 207 such that the relay 203 connected across the output terminals of said rectifier can be energized to its picked-up position only at and above a predetermined speed according to the tuning of the just described filter circuit.

In accordance with my invention, I provide an alternate tuned filter circuit adapted to be cut-in under the control of a change-over relay 210, which is controlled in a manner hereinafter to be described, for the purpose of causing relay 203 to pick-up in response to a second higher predetermined frequency. This alternate filter circuit comprises a condenser 216, a variable reactor 217, and a condenser 218, normally connected in series with each other across the supply lines 201 and 206 leading from the generator 200. When change-over relay 210 is picked-up, as hereinafter described, the contact member 209 thereof is effective to reverse the positions of the two tuned filter circuits electrically with respect to the rectifier, thereby causing the reactor 214, reactor 212, and condenser 213 to be connected in series with each other across the generator supply lines 201 and 206 and connecting the condenser 216 and reactor 217 in parallel with the rectifier 207 with condenser 218 in series with the rectifier. Thus with change-over relay 210 picked-up, relay 203 is picked-up only at and above a second higher predetermined train speed corresponding to the higher tuned frequency of the alternate filter circuit.

The circuit by which the winding of relay 203 is connected to rectifier 207 extends from one output terminal of the rectifier 207 by way of wire 219, a contact member 220 of a relay 221 (to be explained), wire 222, the winding of relay 203, and wire 223 back to the other output terminal of the rectifier 207. A condenser 224 is connected across the output terminals of the rectifier 207 for smoothing out the ripple in the direct current voltage which is supplied for energizing the winding of relay 203.

The tuned circuit used for energizing the relay 204 is similar to that for energizing relay 203 in that it comprises a wire 225, a full wave rectifier 226, wire 227, contact member 228 of relay 210, wire 229, condenser 230, bus wire 201, and in parallel with rectifier 226, a condenser 231 and a variable reactor 232. This circuit is preadjusted by the tuning of the filter circuit including the condensers 230, 231 and reactor 232, such that the current supplied to the rectifier 226 is selectively controlled so that the relay 204 connected across the output terminals of said rectifier can be energized to its picked-up position only at and above a certain uniform speed of the train.

In accordance with my invention, I provide an alternate tuned filter circuit adapted to be cut-in under the control of the change-over relay 210, which is controlled in the manner hereinafter to be described, for the purpose of causing relay 204 to pick-up in response to a second higher predetermined frequency. This alternate filter circuit comprises a condenser 235, a variable reactor 234, and a condenser 233, normally connected in series with each other across the supply lines 201 and 225 leading from the generator 200. When change-over relay 210 is picked-up, as hereinafter described, contact member 228 thereof is effective to reverse the positions of the two tuned filter circuits electrically with respect to the rectifier 226 thereby causing condenser 231, reactor 232 and condenser 230 to be connected in series with each other across the generator supply lines 201 and 225, and connecting condenser 235 and reactor 234 in parallel with the rectifier 226, with condenser 233 in series with the rectifier. Thus with change-over relay 210 picked-up, relay 226 is picked-up only at and above a second higher predetermined train speed corresponding to the higher tuned frequency of the alternate filter circuit.

The circuit by which the winding of relay 204 is connected to rectifier 226, extends from one output terminal of the rectifier 226 by way of wire 236, the contact member 237 of a relay 238 (to be explained), wire 239, the winding of relay 204, and wire 240, back to the other output terminal of the rectifier. A condenser 241 is connected across the output terminals of rectifier 226 for smoothing out the ripple in the direct current voltage supplied for energizing the winding of relay 204.

The tuned circuit for energizing the relay 205 extends from the bus wire 202, through a full wave rectifier 242, wire 243, a condenser 244, wire 245 to bus wire 201, and connected across the rectifier in series with each other, a condenser 246 and a variable reactor 247. The condensers 244 and 246 and the reactor 247 are tuned to resonance at such a frequency that the current supplied to the rectifier 242 is selectively controlled in a manner such that the relay 205 connected across said rectifier can be energized to its picked-up position only at and above a certain uniform speed of the train according to the resonant frequency of the tuned circuit used for energizing said relay.

The circuit by which the winding of the relay 205 is connected to rectifier 242 extends from one output terminal of the rectifier 242 by way of wire 248, contact member 249 of relay 210 (to be explained), wire 250, the winding of relay 205, and wire 251 back to the other output terminal of rectifier 242. A condenser 252 is connected across the output terminals of rectifier 242 for smoothing out the ripple in the direct current voltage supplied from the rectifier.

For the purpose of describing the operation of this embodiment, utilization relays 11, 12, 13, 14 and 15 corresponding to the relays so numbered in Fig. 2 comprising the first described embodiment, are included in the Fig. 3, it being understood that the shunt control portion and its operation is the same as previously described for Fig. 2. The control portion also comprises a relay 253 having contact members 254, 255 and 256, the purpose of which will be explained hereinafter.

Operation of the control portion is as follows:

When the speed of the moving train is below a predetermined speed, say 21 miles per hour, alternating current will be supplied from the generator 200 to the bus wires 201 and 202 and thence to each of the full-wave rectifiers 207, 226, and 242 by way of the respective tuned filter circuits previously described and associated therewith. However, the filter circuits previously described in connection with each of the mentioned rectifiers have been pre-tuned at different frequencies (which vary with the speed of the train) such that at speeds below this predetermined speed of 21 miles per hour, none of the filter circuits will permit sufficient voltage to be supplied to the full-wave rectifiers to be rectified and delivered to the relays 203, 204 and 205 for energizing said relays to their respective picked-up positions. Therefore, at speeds below 21 miles per hour, none of the relays 203, 204 and 205 will be picked-up.

When the speed of the train reaches the predetermined speed of 21 miles per hour, the frequency of the current supplied by the generator 200 is such that it corresponds with the resonant frequency of the filter circuit described for energizing relay 203 by way of the rectifier 207. Therefore, at 21 miles per hour the filter circuit for relay 203 allows a sufficient voltage to be supplied to the rectifier 207 to be rectified and delivered to relay 203 such that relay 203 is energized to its picked-up position thus closing the contact member C of relay 203.

With contact member C of relay 203 in its picked-up, that is closed position, a circuit is completed from the battery supply 199 by way of wire 257, wire 258, closed contact member C of relay 203, the winding of relay 221, wire 259, and wire 260 back to the battery supply 199 for energizing relay 221 to its picked-up position. The picking-up of relay 221 opens the contact members 220 and 261, and closes the contact members 262, 263 and 264.

When contact member 220 is open, a resistor 265 is thereby cut into the circuit previously described for energizing relay 203. The cutting-in of resistor 265 in this circuit is for the purpose of assuring the pick-up and drop-out of relay 203 at substantially the same speed of the train, namely the predetermined speed of 21 miles per hour. The necessity for this assured drop-out feature was explained previously in connection with the assured drop-out feature used in the embodiment of the control portion shown in Fig. 1.

The closing of contact member 262 of relay 221 completes a circuit for energizing utilization relay 11 from the battery supply 199 by way of wire 260, contact member 262, wire 266, winding of relay 11, and wires 267 and 257 back to the battery supply 199. Upon energization, relay 11 causes the shunting portion to function to give the first transition step as previously explained in the description of operation of said shunting portion.

The closing of contact member 264 of relay 221 establishes a connection from the battery supply 199 by way of wire 257, wire 258, wire 268, contact member 264, and wire 269, to the contact member C of relay 204 for a purpose hereinafter described.

The opening of contact member 261 and the closing of contact member 263 of relay 221 is without effect at this speed but is necessary for control functions to be effected at predetermined higher train speeds, as will be explained hereinafter.

When the speed of the train increases to a second predetermined speed, say 26 miles per hour, the frequency of the current supplied by the generator 200 is such that it corresponds with the pre-tuned frequency of the filter circuit described for energizing the relay 204 by way of rectifier 226. At this speed of 26 miles per hour, not only the filter circuit for relay 203, but also the filter circuit for relay 204 permits sufficient voltage to be supplied to the respective rectifiers 207 and 226 and thus rectified and delivered to the respective relays 203 and 204, such that relay 203 is maintained picked-up and relay 204 is energized to its picked-up position.

With relay 204 picked-up, the contact member C of said relay is closed thus completing a circuit from the battery supply 199 by way of wire 257, wire 258, contact member 264 of relay 221, wire 269, contact member C of relay 204, wire 270, winding of relay 238, the wire 271, and wire 260 to the battery supply 199, for energizing the relay 238 to its picked-up position.

With relay 238 energized to its picked-up position, the contact members 272 and 273 of said relay are closed, and the contact member 237 of said relay is open. When contact member 237 of relay 238 is open, a resistor 274 is thereby cut into circuit previously described for energizing relay 204, thus assuring the picked-up and drop-out of relay 204 at substantially the same speed of the train, namely the predetermined speed of 26 miles per hour.

The closing of contact member 272 of relay 238 results in the completion of a circuit for energizing and picking-up utilization relay 12 from the battery supply 199, by way of wire 260, wire 275, contact member 272 of relay 238, wires 276 and 277, winding of relay 12, and wires 267 and 257 to the battery supply 199. Upon energization, the relay 12 causes said shunting portion to function as previously explained to give the second transition step.

It should be noted here that the proper sequence of transition steps is insured by reason of the fact that contact member 264 of relay 221 must be closed incidental to the first transition step, in order to enable the relay 238 to become energized to complete the second transition step.

The closing of contact member 273 of relay 238 is without effect at this speed (26 miles per hour) but is necessary for functions to be effected at predetermined increased speeds, as will be explained hereinafter.

When the speed of the train increases to a third predetermined speed, say 33 miles per hour, the frequency of the current supplied by the generator 200 has increased such that it corresponds with the pre-tuned frequency of the filter circuit described for energizing the relay 205 by way of the rectifier 242. At this speed of 33 miles per hour, not only the filter circuits previously described in use with the relays 203 and 204, but also the filter circuit for relay 205 permits sufficient voltage to be supplied to the respective rectifiers 207, 226 and 242, and thus rectified and delivered to the respective relays 203, 204 and 205, such that the relays 203 and 204 remain picked-up (temporarily as will be explained), and the relay 205 is energized to its picked-up position.

With relay 205 picked-up, the contact member C of said relay is closed, thus completing a circuit from the battery supply 199 by way of wire 278, the contact member C of relay 205, wire 279, winding of relay 210, wire 280, and wire 260 to the battery supply 199 for energizing relay 210 to its picked-up position.

With relay 210 energized to its picked-up position, the contact member 249 of said relay is open, the contact members 281, 282, 283 and 284 of said relay are closed, and the contact members 228 and 209 of said relay are moved from their respective down-closed position to their respective upper-closed positions.

When the contact member 249 of relay 210 is open, a resistor 285 is cut-into the circuit previously described for energizing the winding of relay 205, thus assuring the pick-up and the drop-out of relay 205 at substantially the same speed as the train, namely the predetermined speed of 33 miles per hour.

As soon as the contact member 209 of relay 210 is in its upper-closed position, the then functioning filter circuit for energizing the relay 203 is cut-out and replaced by the alternate filter circuit consisting of the condenser 216, variable reactor 217, and tuning condenser 218. This alternate filter circuit for use in energizing relay 203 is pre-tuned at a higher frequency than the filter circuit for which it was just substituted such that at this speed (33 miles per hour) the alternate filter circuit will not permit sufficient voltage to be supplied to the rectifier 207 to be rectified and delivered to the relay 203 for energizing relay 203 to its picked-up position. Therefore, the relay 203 will be deenergized and dropped-out. In a similar manner, with the moving of the contact member 228 of relay 210 to its upper-closed position, the alternate filter circuit for relay 204 consisting of the condenser 235, variable reactor 234, and condenser 233, is substituted for the previously described filter circuit (tuned to a relatively lower frequency) for use in energizing relay 204, with the result that relay 204 becomes deenergized and drops-out.

It can be seen that dropping-out of relay 203 and its contact member C effects the dropping-out of relay 221 and its respective contact members. Similarly the dropping-out of relay 204 and its contact member C effects the dropping-out of relay 238 and its respective contact members.

The dropping-out of relay 203 as just explained, which effects the consequent dropping-out of relay 221 and its contact member 262 does not result in the consequent interrupting of the circuit described for energizing the relay 11 of the shunting portion, because of the fact that the contact member 282 of the relay 210 parallels contact member 262 of relay 221 and is thus effective in its picked-up or closed position to maintain the energizing circuit for relay 11 of the shunting portion.

Similarly, the dropping-out of relay 204 as just explained which effects the consequent dropping-out of relay 238 and its contact member 272 does not result in the interruption of the circuit described for energizing relay 12 of the shunting portion, because the contact member 283 of relay 210 parallels contact member 272 of relay 238 and is thus effective in its picked-up position, that is closed position, to maintain the circuit for energizing relay 12 of the shunting portion.

With the contact member 284 of relay 210 in its picked-up position, that is closed position, a circuit is thereby completed for energizing the relay 13 of the shunting portion, which circuit extends from the battery supply 199 by way of wire 260, wire 286, contact member 284 of relay 210, wire 287, winding of relay 13, wires 267 and 257 back to the battery supply 199. The completion of this circuit energizes the relay 13 of the shunting portion to cause said shunting portion to function as previously explained to effect the third transition step.

The picking-up of relay 210 which effects the consequent dropping-out of relay 221 also completes a circuit for energizing and picking-up the relay 253 by way of the battery supply 199, wire 260, wire 288, the closed contact 281 of relay 210, wire 289, closed contact 261 of relay 221, wire 290, winding of relay 253, and wire 257 to the battery supply 199. With relay 253 picked-up, contact members 254, 255 and 256 are closed. The closing of contact member 254 of relay 253 substitutes a "stick" circuit consisting of wire 291 and contact member 254 of relay 253 in place of contact member 261 of relay 221 in the circuit for energizing relay 253, such that the relay 253 will remain energized and picked-up when the contact member 261 of relay 221 is again opened as will be later explained.

The closing of contact members 255 and 256 of relay 253 is without effect at this speed of the train (33 miles per hour), but is necessary for functions to be effected at predetermined increased speeds, as will be explained hereinafter.

When the speed of the train increases to a fourth predetermined speed (according to the pre-tuning of the alternate filter circuit described for relay 203), say 41 miles per hour, the frequency of the current supplied by the generator 200 has increased such that it corresponds with the pre-tuned frequency of the alternate filter circuit used in energizing relay 203. At this speed of 41 miles per hour not only the filter circuit used in energizing relay 205 but also the alternate filter circuit used with relay 203 permits sufficient voltage to be supplied to the respective rectifiers 242 and 207, and thus rectified and delivered to the respective relays 205 and 203, such that the relay 205 remains picked-up and relay 203 is again energized and picked-up. Contact member C of relay 203 is thus closed to energize and pick-up relay 221, thereby closing contact members 262, 263 and 264, and opening contact members 261 and 220.

With contact member 220 open, the resistor 265 is thus again placed in the energizing circuit of relay 203 to provide the assured drop-out feature of said relay as explained previously.

With contact member 263 of relay 221 closed, a circuit is thereby completed for energizing and picking-up relay 14 of the shunting portion shown in Fig. 2, by way of the battery supply 199, wire 260, wire 292, closed contact member 263 of relay 221, wire 293, closed contact member 255 of relay 253, wire 294, winding of relay 14, wire 267, and wire 257 to the battery supply 199. This energizing of relay 14 in the shunting portion causes the said shunting portion to function as previously described to effect the fourth transition step.

The closing of contact member 264 of relay 221 establishes a connection to contact member C of relay 204 as previously described. The opening of contact member 261 of relay 221 at this speed does not effect the deenergization of relay 253 since the contact member 254 of relay 253 is closed as previously described to maintain the mentioned "stick" circuit.

The closing of contact member 262 of relay 221 is without effect at this speed (41 miles per hour).

When the speed of the train increases to a fifth predetermined speed (according to the pre-tuning of the alternate filter circuit described for relay 204), say 65 miles per hour, the frequency of the current supplied by the generator 200 is increased such that it corresponds with the pre-tuned frequency of the alternate filter circuit used in energizing relay 204. At this speed of 65 miles per hour, not only the filter circuit used in energizing relay 205 and the alternate filter circuit used in energizing relay 203, but also the alternate filter circuit used in energizing relay 204, permit sufficient voltage to be supplied to the respective rectifiers 242, 207 and 226, and thus rectified and delivered to the respective relays 205, 203 and 204 such that relays 205 and 203 remain picked-up and relay 204 is again energized and picked-up. When relay 204 is picked-up at this speed (65 miles per hour) the consequent closing of its contact member C again establishes a circuit to energize and pick-up relay 238, thereby closing contact members 272 and 273 and opening contact member 237 of relay 238.

The opening of contact member 237 places the resistor 274 in the energizing circuit of relay 204 to again provide the assured drop-out feature of said relay as previously explained.

With contact member 273 of relay 238 closed at this speed (65 miles per hour), a circuit is completed for energizing and picking-up the relay 15 of the shunting portion by way of the battery supply 199, wire 260, wire 292, wire 295, contact member 273 of relay 238, wire 296, contact member 256 of relay 253, wire 297, the winding of relay 15, wire 267 and wire 257 to the battery supply 199. The energizing and picking-up of relay 15 in the shunting portion causes the said shunting portion to function as previously described in the description of said shunting portion to interrupt the armature circuits of the traction motors, thus stopping said motors as previously explained.

Figure 4:
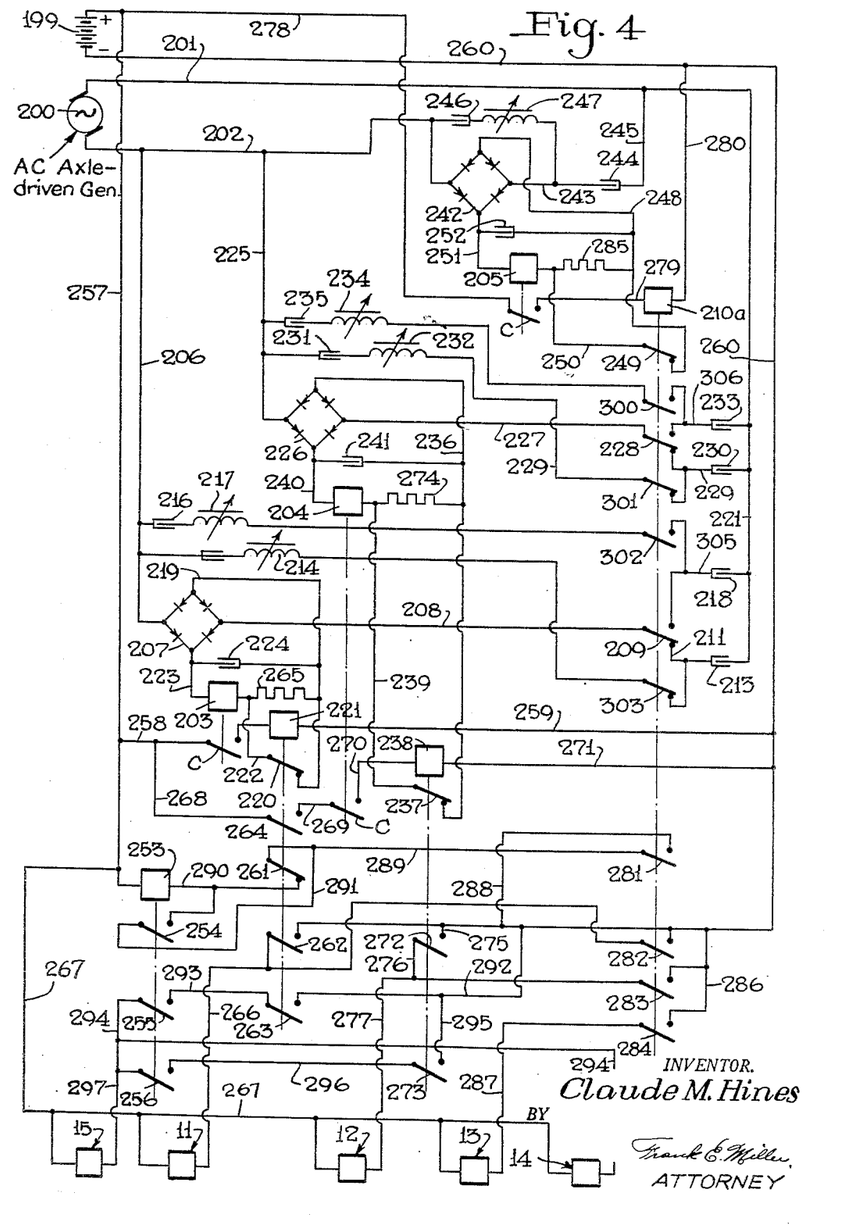
Fig. 4 is a diagrammatic view of an embodiment which is a modification of that shown in Fig. 3.

Fig. 4 shows a modification of the embodiment shown in Fig. 3. This modification differs from the embodiment shown in Fig. 3 in that different tuned filter circuits and different alternate tuned filter circuits are used in a manner such that when either the tuned or the alternate tuned filter circuit is operatively effective, the other is disconnected altogether from the generator 200. By this arrangement the load on the generator 200 is less than in the system shown in Fig. 3, thus reducing the heating, due to load, of equivalent sized generators or enabling a smaller capacity generator to be used. Only so much of the apparatus in Fig. 4 will be described as differs from the apparatus shown in Fig. 3, and like parts in the two apparatus will be identified by the same reference numerals without further description in connection with the modification in Fig. 4.

The apparatus in Fig. 4 differs from that in Fig. 3, in that a relay 210a is employed instead of the relay 210 of Fig. 3, the relay 210a being similar in structure and function to relay 210 with the exception that it includes additional contact members 300, 301, 302 and 303. Such additional contact members enable the selective control of tuned filter circuit and the alternate tuned filter circuit in such a way that the filter circuit which is not operatively effective is disconnected altogether from the generator 200, as previously mentioned.

The filter circuits for relay 203 in Fig. 4 are constituted by the same devices and elements as in Fig. 3 except that the reactor 212 is omitted and a condenser 304 is added in series with reactor 214. While corresponding elements of the filter circuits in Fig. 4 and in Fig. 3 are structurally the same, the tuning of the circuits is not necessarily the same.

Since the operation of the apparatus shown in Fig. 4 as a whole is similar to and will be understood from the description of the operation of the embodiment shown in Fig. 3, the description of the operation of the embodiment shown in Fig. 4 will therefore be limited to describing only the difference in operation resulting from the modification involving use of relay 210a instead of relay 210.

With relay 210a deenergized, the operatively effective filter circuit for relay 203 is the tuned filter circuit established by contact members 209 and 303 of relay 210a, said tuned filter circuit extending from the bus wire 202, by way of wire 206, the full wave rectifier 207, wire 208, contact member 209 of relay 210a in its lower closed position, wire 211, condenser 213 to bus wire 201, with condenser 304 and reactor 214 connected in series with each other and paralleling the rectifier 207 by way of the closed contact member 303 of relay 210a. With the relay 210a energized, the operatively effective filter circuit for relay 203 is the alternate tuned filter circuit established by contact members 209 and 302 of relay 210a, said alternate tuned filter circuit extending from the bus wire 202 by way of wire 206, the rectifier 207, wire 208, contact member 209 of relay 210a in its upper-closed position, wire 305, and condenser 218 to bus wire 201, with condenser 216 and reactor 217 connected in series with each other and paralleling the rectifier by way of the closed contact member 302 of relay 210a.

It can thus be seen that when the tuned filter circuit is operatively effective as explained by reason of relay 210a being deenergized and contact member 209 of said relay in its down-closed position, and contact member 303 closed, the contact member 302 of said relay is open, thereby disconnecting the alternate tuned filter circuit from the generator 200; and likewise when the alternate tuned filter circuit is operatively effective as explained by reason of the relay 210a being energized and contact member 209 of said relay in its upper-closed position and contact member 302 closed, the contact member 303 of said relay is open thereby disconnecting the tuned filter circuit from the generator 200. Thus only one of the filter circuits for relay 203 is connected across the generator 200 at any one time.

With the relay 210a deenergized, the operatively effective filter circuit for relay 204 is the tuned filter circuit established by contact members 228 and 301 of relay 210a, said tuned filter circuit extending from the bus wire 202 by way of wire 225, the rectifier 226, wire 227, contact member 228 of relay 210a in its down-closed position, wire 229, condenser 230, to bus wire 201, with condenser 231 and reactor 232 connected in series with each other and paralleling the rectifier 226 by way of the closed contact member 301 of relay 210a.

With the relay 210a energized, the operatively effective filter circuit for relay 204 is the alternate tuned filter circuit established by contact members 228 and 300 of relay 210a, said alternate tuned filter circuit extending from the bus wire 202 by way of wire 225, the rectifier 226, wire 227, contact member 228 of relay 210a in its upper-closed position, wire 306, condenser 233 to bus wire 201, with condenser 235 and reactor 234 connected in series with each other and paralleling the rectifier 226 by way of the closed contact member 300 of relay 210a.

It can thus be seen that similar to the filter circuits for the relay 203, when the tuned filter circuit for relay 204 is made operatively effective, by means of closed contact member 301 and contact member 228 of relay 210a in its down-closed position, the alternate tuned filter circuit for relay 204 is disconnected from the generator 200 by opened contact member 300 of relay 210a in its open position and when the alternate tuned filter circuit for relay 204 is made operatively effective by means of closed contact member 300 and contact member 228 of relay 210a in its upper-closed position, the tuned filter circuit for relay 204 is disconnected from the generator 200 by the opened contact member 301 of relay 210a. Thus only one of the filter circuits for relay 204 is connected across the generator 200 at any one time.

*Summary*

Summarizing, it will be seen that I have disclosed several embodiments of propulsion control apparatus for vehicles, such as railway locomotives of the diesel-electric type. Each embodiment provides a speed control system which employs a number of relays which operate in accordance with the speed of the train, to obtain a number of traction motor speed transition steps larger than the number of relays.

In one embodiment, an axle-driven direct current generator is used in conjunction with a number of voltage responsive relays to obtain the desired speed transitioning. Two other embodiments are provided, each of which employs an axle-driven alternating current generator and a number of relays sequentially operated responsively according to the frequency of the alternating current supplied by the generator through alternatively effective tuned filter circuits in such a way as to provide an initial operating sequence and a secondary operating sequence of the relays for the purpose of controlling the speed transition operation. The second of the alternating current embodiments differs from the first in that only the tuned filter circuit which is effective remains connected to the generator circuit, as distinguished from the first embodiment in which the non-operative tuned filter circuit is allowed to remain in the generator circuit.

Each of the embodiments includes a traction motor field-coil shunting portion responsive to the actions of the sequentially operative relays to vary the strength of the field-coils of the traction motors and thus vary the speed thereof.

Each of the embodiments also includes a relay means for stopping the desired motor at a predetermined overspeed to aid in minimizing the danger of accidents at high speeds.

The embodiments employing alternating current generators for speed control provide a propulsion control system which gives the desired transition steps at predetermined uniform speeds notwithstanding variations of the ambient temperature of the axle-driven generator.

Having now described my invention, what I claim as new and desire to secure by Letters Patent, is:

1. In apparatus for controlling a vehicle traction motor to provide a certain number of sequential speed transition steps, the combination of a plurality of relays less in number than said certain number of speed transition steps, means for effecting operation of said relays in an initial sequence and then in a secondary sequence with an increasing speed of the vehicle, said relays being effective to establish a different speed transition step with operation of each of said relays in the initial and secondary sequences.

2. In apparatus for controlling a vehicle traction motor to provide a certain number of sequential speed transition steps, the combination of a plurality of relays less in number than said certain number of speed transition steps, means for effecting operation of said relays in one sequence and then in another sequence with a decreasing speed of the vehicle, said relays being effective to establish a different speed transition step with operation of each of said relays in the initial and secondary sequences.

3. In apparatus for controlling a vehicle traction motor to provide a certain number of sequential speed transition steps, the combination of a plurality of relays less in number than said certain number of speed transition steps, means for effecting operation of said relays in an initial sequence and then in a secondary sequence with an increasing speed of the vehicle, and for effecting operation of said relays in reverse order responsively with a decreasing speed of the vehicle, said relays being effective to establish a different speed transition step with operation of each of said relays in the initial and secondary sequences.

4. In apparatus for controlling a vehicle traction motor to provide a certain number of sequential speed transition steps, the combination of a plurality of relays less in number than said certain number of speed transition steps, means for effecting operation of all of said relays in an initial sequence and then certain of said relays in a secondary sequence with an increasing speed of the vehicle, said relays being effective to establish a different speed transition step with operation of each of said relays in the initial and secondary sequences.

5. In apparatus for controlling a vehicle traction motor to provide a certain number of sequential speed transition steps, the combination of a plurality of electro-responsive relays less in number than said certain number of speed transition steps, meaning providing an electrical characteristic varying in degree according to the speed of the vehicle, means for causing operation of said relays in an initial sequence and then in a secondary sequence responsively to an increasing degree of said electrical characteristic, said relays being effective to establish a different speed transition step with operation of each of said relays in the initial and secondary sequences.

6. In apparatus for controlling a vehicle traction motor to provide a certain number of sequential speed transition steps, the combination of a plurality of electro-responsive relays less in number than said certain number of speed transition steps, means providing an electrical characteristic varying in degree according to the speed of the vehicle, means for causing operation of said relays in an initial sequence and then in a secondary sequence responsively to an increasing degree of said electrical characteristic, and for causing operation of said relays in reverse order responsively with a decreasing degree of said electrical characteristic, said relays being effective to establish a different speed transition step with operation of each of said relays in the initial and secondary sequences.

7. In apparatus for controlling a vehicle traction motor to provide a certain number of sequential speed transition steps, the combination of a plurality of electroresponsive relays less in number than said certain number of speed transition steps, means providing an electrical characteristic varying in degree according to the speed of the vehicle, means for causing operation of all of said relays in an initial sequence and then certain of said relays in a secondary sequence responsively to an increasing degree of said electrical characteristic, said relays being effective to establish a different speed transition step with operation of each of said relays in the initial and secondary sequences.

8. In apparatus for controlling a vehicle traction motor to provide a certain number of sequential speed transition steps, the combination of a plurality of relays less in number than said certain number of speed transition steps, means providing a direct current voltage varying in degree according to the speed of the vehicle, means for causing operation of said relays in an initial sequence and then in a secondary sequence responsively to an increasing degree of said direct current voltage, said relays being effective to establish a different speed transition step with operation of each of said relays in the initial and secondary sequences.

9. In apparatus for controlling a vehicle traction motor to provide a certain number of sequential speed transition steps, the combination of a plurality of relays less in number than said certain number of speed transition steps, means providing a direct current voltage varying in degree according to the speed of the vehicle, means for causing operation of said relays in an initial sequence and then in a secondary sequence responsively to an increasing degree of said direct current voltage, and for causing operation of said relays in reverse order responsively with a decreasing degree of said direct current voltage, said relays being effective to establish a different speed transition step with operation of each of said relays in the initial and secondary sequences.

10. In apparatus for controlling a vehicle traction motor to provide a certain number of sequential speed transition steps, the combination of a plurality of relays less in number than said certain number of speed transition steps, means providing an alternating current voltage varying in frequency according to the speed of the vehicle, means for causing operation of said relays in an initial sequence and then in a secondary sequence responsively to an increasing frequency of said alternating current voltage, said relays being effective to establish a different speed transition control step with operation of each of said relays in the initial and secondary sequences.

11. In apparatus for controlling a vehicle traction motor to provide a certain number of sequential speed transition steps, the combination of a plurality of relays less in number than said certain number of speed transition steps, means providing an alternating current voltage varying in frequency according to the speed of the vehicle, a first tuned circuit means for each of said relays effective to cause operation of said relays in a first sequence responsively to an increasing frequency of said alternating current voltage, second tuned circuit means for certain of said relays effective to cause operation of said certain relays in a secondary sequence responsively to a further increase of frequency of said alternating current voltage, means for rendering said first tuned circuit means for each of said relays effective to control operation of said relays in said first sequence while rendering said second tuned circuit means ineffective to control operation of said relays in said first sequence, and for rendering said second tuned circuit means effective to control operation of said certain relays in said secondary sequence while rendering said first tuned circuit means for said certain relays ineffective to control operation of said relays in said secondary sequence, said relays being effective to establish a different speed transition step with operation of each of said relays in the initial and secondary sequences.

12. In apparatus for controlling a vehicle traction motor to provide a certain number of sequential speed transition steps, the combination of a plurality of relays less in number than said certain number of speed transition steps, means providing an alternating current voltage varying in frequency according to the speed of the vehicle, a first tuned circuit means for each of said relays effective to cause operation of said relays in a first sequence responsively to an increasing frequency of said alternating circuit voltage, second tuned circuit means for certain of said relays effective to cause operation of said relays in a secondary sequence responsively to a further increase of frequency of said alternating current voltage, means operative to cause said second tuned circuit means to be disconnected from said alternating current voltage means when said first tuned circuit means is connected thereto, and for causing said first tuned circuit means to be disconnected from said alternating current voltage means when said second tuned circuit means is connected thereto, said relays being effective to establish a different speed transition control step with operation of each of said relays in the initial and secondary sequences.

13. In apparatus for controlling a vehicle traction motor to provide a certain number of sequential speed transition steps, the combination of a plurality of relays less in number than said certain number of speed transition steps, means providing an alternating current voltage varying in frequency according to the speed of the vehicle, a first tuned circuit means for each of said relays effective to cause operation of said relays in a first sequence responsively to an increasing frequency of said alternating circuit voltage, second tuned circuit means for certain of said relays effective to cause operation of said relays in a secondary sequence responsively to a further increase of frequency of said alternating current voltage, electro-responsive means operative to cause said second tuned circuit means to be disconnected from said alternating current voltage means when said first tuned circuit means is connected thereto, and for causing said first tuned circuit means to be disconnected from said alternating current voltage means when said second tuned circuit means is connected thereto, means responsive to operation of the last of the relays in the said first sequence to effect operation of said electro-responsive means, said relays being effective to establish a different speed transition control step with operation of each of said relays in the initial and secondary sequences.

14. In apparatus for controlling a vehicle traction motor to provide a certain number of sequential speed transition steps, the combination of a plurality of relays less in number than said certain number of speed transition steps, means providing a direct current voltage varying in degree according to the speed of the vehicle, a first circuit means for each of said relays effective to cause operation of said relays in a first sequence responsively to an increasing degree of said direct current voltage, second circuit means for certain of said relays effective to cause operation of said certain relays in a secondary sequence responsively to further increase in degree of said direct current voltage, means for rendering said second circuit means ineffective when said first circuit means are effective and operative to cause said first circuit means to be ineffective while rendering said second circuit means effective, said relays being effective to establish a different speed transition control step with operation of each of said relays in the initial and secondary sequences.

15. In apparatus for controlling a vehicle traction motor to provide a certain number of sequential speed transition steps, the combination of a plurality of relays less in number than said certain number of speed transition steps, means providing a direct current voltage varying in degree according to the speed of the vehicle, a first circuit means for each of said relays effective to cause operation of said relays in a first sequence responsively to an increasing degree of said direct current voltage, second circuit means for certain of said relays effective to cause operation of said certain relays in a secondary sequence responsively to a further increasing degree of said direct current voltage, electro-responsive means for rendering said second circuit means ineffective when said first circuit means are effective and operative to cause said first circuit means to be ineffective while rendering said second circuit means effective, and means responsive to operation of the last of the relays in the said first sequence to effect operation of said electro-responsive means, said relays being effective to establish a different speed transition control step with operation of each of said relays in the initial and secondary sequences.

16. In apparatus for controlling a vehicle traction motor to provide a certain number of sequential speed transition steps, the final one of which, results in interruption of power to said motor, the combination of a plurality of electro-responsive relays less in number than said certain number of speed transition steps, means providing an electrical characteristic varying in degree according to the speed of the vehicle, means for causing operation of all of said relays in an initial sequence and then certain of said relays in a secondary sequence responsively to an increasing degree of said electrical characteristic, said relays being effective to establish a different speed transition step with operation of each of said relays in the initial and secondary sequences.

17. In apparatus operative to cause different degrees of resistance shunting of the exciting field coils of a traction motor so as to provide a certain number of sequential speed transition steps, the combination of a plurality of relays less in number than said certain number of speed transition steps, means for effecting operation of all of said relays in an initial sequence and then certain of said relays in a secondary sequence with an increasing speed of the vehicle, said relays being effective to establish a different degree of resistance shunting of the field coils of said traction motor to establish a different speed transition step with operation of each of said relays in the initial and secondary sequences.

18. In apparatus for controlling a vehicle traction motor to provide a certain number of sequential speed transition steps, the combination of a plurality of relays less in number than said certain number of speed transition steps, means providing a direct current voltage varying in degree according to the speed of the vehicle, resistance circuit means for causing operation of said relays in an initial sequence and then in a secondary sequence responsively to an increasing degree of said direct current voltage, said relays being effective to establish a different speed transition step with operation of each of said relays in the initial and secondary sequences.

19. In apparatus for controlling a vehicle traction motor to provide a certain number of sequential speed transition steps, the combination of a plurality of relays less in number than said certain number of speed transition steps, means providing an alternating current voltage varying in frequency according to the speed of the vehicle, tuned filter circuit means for causing operation of said relays in an initial sequence and then in a secondary sequence responsively to an increasing frequency of said alternating current voltage, said relays being effective to establish a different speed transition control step with operation of each of said relays in the initial and secondary sequences.

20. Control apparatus comprising a source of electrical energy providing an electrical quantity variable in accordance with the speed of a movable member, relay means operatively responsive to the increase of said electrical quantity to above a certain one value, and changeover means operatively responsive to the increase in said electrical quantity above a certain second value, higher than said one value, for causing said relay means to be thereafter operatively responsive to the increase in said electrical quantity to above a certain third value, higher than said certain second value.

21. Control apparatus comprising a source of electrical energy providing an electrical quantity variable in accordance with the speed of a movable member, relay means operatively responsive to the increase of said electrical quantity to above a certain one value to establish a certain control condition, and changeover means operatively responsive to the increase in said electrical quantity to above a certain second value, higher than said one value, to maintain said control condition and to cause said relay means thereafter to be operatively responsive to the increase in said electrical quantity to above a certain third value, higher than said certain second value, to establish a second control condition.

22. Control apparatus comprising a source of electrical energy, a control circuit, generating means providing an electric current variable in accord with operating speed of a movable member, first relay means responsive to variation in said electric current to above and to below a certain one value to establish and to disestablish, respectively, one energizing connection between said control circuit and said source of electrical energy, electric current restricting means adapted to be rendered effective and ineffective to reduce the degree of electric current received by said first relay means for raising to a second value, higher than said one value, the electric current above and below which said first relay means responds to establish and to disestablish, respectively, said one energizing connection, and second relay means responsive to variation in said electric current to below and to above a value intermediate said one value and said second value to render said electric current restricting means ineffective and effective, respectively, and to disestablish and establish, respectively, an alternate energizing connection between said control circuit and said source, respectively.

23. A vehicle traction motor control system including, in combination: at least one traction motor; a signal generator operatively connected to the traction motor and adapted to generate a control signal having a preselected measurable characteristic, the measure of which is proportioned to the speed of the motor; a source of power for the motor; first, second, and third utilization relays; circuit means including first, second, and third resistor means and the contacts of said first, second, and third utilization relays for connecting said source of power to the traction motor, the contacts of said first, second, and third utilization relays selectively connecting said first, second, and third resistor means respectively in and out of circuit to control the speed of said traction motor in accordance with the energization of said first, second, and third utilization relays; first control means including a first control relay, adapted to have said control signal applied thereto and to energize said first control relay a first time when the characteristic of said control signal assumes a first predetermined measure; other circuit means interconnecting said first control means and said first utilization relay for energizing said first utilization relay when said first control relay is energized said first time; second control means including a second control relay, adapted to have said control signal applied thereto and to energize said second control relay when the characteristic of said control signal assumes a second predetermined measure different from the first measure; additional circuit means interconnecting said second control means and said second utilization relay for energizing said second utilization relay when said second control relay is energized; alternate circuit means operatively connected to said first and second control means for deenergizing said first control relay when said second control relay is energized, said alternate circuit means also being operatively connected to said first utilization relay for maintaining said first utilization relay energized after said first control relay is deenergized; said first control means being adapted, after the second control relay is energized, to energize said first control relay a second time when the characteristic of said control signal assumes a third predetermined measure differing from said second measure in the same sense that said second measure differed from said first measure; and further circuit means interconnecting said first control means, second control means, and third utilization relay for energizing said third utilization relay when said first control relay is energized said second time.

24. A vehicle traction motor control system including, in combination: at least one traction motor; a signal generator operatively connected to the traction motor and adapted to generate a control signal having an amplitude proportional to the speed of the motor; a source of power for the motor; first, second, and third utilization relays; circuit means including first, second, and third resistor means and the contacts of said first, second, and third utilization relays for connecting said source of power to the traction motor, the contacts of said first, second, and third utilization relays selectively connecting said first, second, and third resistor means respectively in and out of circuit to control the speed of said traction motor in accordance with the energization of said first, second, and third utilization relays; first control relay means including a first control relay, adapted to have said control signal applied thereto and to energize said first control relay a first time when said control signal attains a first predetermined amplitude; other circuit means interconnecting said first control relay means and said first utilization relay for energizing said first utilization relay when said first control relay is energized said first time; second control relay means including a second control relay, adapted to have said control signal applied thereto and to energize said second control relay when said control signal attains a second predetermined amplitude greater than said first predetermined amplitude; additional circuit means interconnecting said second control relay means and said second utilization relay for energizing said second utilization relay when said second control relay is energized; alternate circuit means operatively connected to said first and second control relay means for deenergizing said first control relay when said second control relay is energized, said alternate circuit means also being operatively connected to said first utilization relay for maintaining said first utilization relay energized after said first control relay is deenergized; said first control relay means being adapted, after the second control relay is energized, to energize said first control relay a second time when said control signal attains a third predetermined amplitude greater than said second predetermined amplitude; and further circuit means interconnecting said first control relay means, second control relay means, and third utilization relay for energizing said third utilization relay when said first control relay is energized said second time.

25. A vehicle traction motor control system including, in combination: at least one traction motor; a signal generator operatively connected to the traction motor and adapted to generate an alternating current control signal having a frequency proportional to the speed of the motor; a source of power for the motor; first, second, and third utilization relays; circuit means including first, second, and third resistor means and the contacts of said first, second, and third utilization relays for connecting said source of power to the traction motor, the contacts of said first, second, and third utilization relays selectively connecting said first, second, and third resistor means respectively in and out of circuit to control the speed of said traction motor in accordance with the energization of said first, second, and third utilization relays; first control means including first alternating current frequency selective means and a first control relay, adapted to have said control signal applied thereto and to energize said first control relay a first time when the frequency of said control signal reaches a first predetermined value; other circuit means interconnecting said first control means and said first utilization relay for energizing said first utilization relay when said first control relay is energized said first time; second control means including second alternating current frequency selective means and a second control relay, adapted to have said control signal applied thereto and to energize said second control relay when the frequency of said control signal reaches a second predetermined value greater than said first predetermined value; additional circuit means interconnecting said second control means and said second utilization relay for energizing said second utilization relay when said second control relay is energized; alternate circuit means operatively connected to said first and second control means for deenergizing said first control relay when said second control relay is energized, said alternate circuit means also being operatively connected to said first utilization relay for maintaining said first utilization relay energized after said first control relay is deenergized; said first control means being adapted, after the second control relay is energized, to energize said first control relay a second time when the frequency of said control signal attains a third predetermined value greater than said second predetermined value; and further circuit means interconnecting said first control means, second control means, and third utilization relay for energizing said third utilization relay when said first control relay is energized said second time.

26. A relay control circuit of the type in which a plurality of utilization relays are sequentially operated in response to successive discrete changes in a preselected measurable characteristic of a control signal applied to the circuit, comprising, in combination: first, second, and third utilization relays; first control means including a first control relay, adapted to have said control signal applied thereto and to energize said first control relay a first time when the characteristic of said control signal assumes a first predetermined measure; circuit means interconnecting said first control means and said first utilization relay for energizing said first utilization relay when said first control relay is energized said first time; second control means including a second control relay, adapted to have said control signal applied thereto and to energize said second control relay when the characteristic of said control signal assumes a second predetermined measure different from the first measure; additional circuit means interconnecting said second control means and said second utilization relay for energizing said second utilization relay when said second control relay is energized; alternate circuit means operatively connected to said first and second control means for deenergizing said first control relay when said second control relay is energized, said alternate circuit means also being operatively connected to said first utilization relay for maintaining said first utilization relay energized after said first control relay is deenergized; said first control means being adapted, after the second control relay is energized, to energize said first control relay a second time when the characteristic of said control signal assumes a third predetermined measure differing from said second measure in the same sense that said second measure differed from said first measure; and further circuit means interconnecting said first control means, second control means, and third utilization relay for energizing said third utilization relay when said first control relay is energized said second time.

27. A relay control circuit of the type in which a plurality of utilization relays are sequentially operated in response to successive discrete changes in the amplitude of a control signal applied to the circuit, comprising, in combination: first, second, and third utilization relays; first control relay means including a first control relay, adapted to have said control signal applied thereto and to energize said first control relay a first time when said control signal attains a first predetermined amplitude; circuit means interconnecting said first control relay means and said first utilization relay for energizing said first utilization relay when said first control relay is energized said first time; second control relay means including a second control relay, adapted to have said control signal applied thereto and to energize said second control relay when said control signal attains a second predetermined amplitude greater than said first predetermined amplitude; additional circuit means interconnecting said second control relay means and said second utilization relay for energizing said second utilization relay when said second control relay is energized; alternate circuit means operatively connected to said first and second control relay means for deenergizing said first control relay when said second control relay is energized, said alternate circuit means also being operatively connected to said first utilization relay for maintaining said first utilization relay energized after said first control relay is deenergized; said first control relay means being adapted, after the second control relay is energized, to energize said first control relay a second time when said control signal attains a third predetermined amplitude greater than said second predetermined amplitude; and further circuit means interconnecting said first control relay means, second control relay means, and third utilization relay for energizing said third utilization relay when said first control relay is energized said second time.

28. A relay control circuit of the type in which a plurality of utilization relays are sequentially operated in response to successive discrete changes in the frequency of an alternating current control signal applied to the circuit, comprising, in combination: first, second, and third utilization relays; first control means including first alternating current frequency selective means and a first control relay, adapted to have said control signal applied thereto and to energize said first control relay a first time when the frequency of said control signal reaches a first predetermined value; circuit means interconnecting said first control means and said first utilization relay for energizing said first utilization relay when said first control relay is energized said first time; second control means including second alternating current frequency selective means and a second control relay, adapted to have said control signal applied thereto and to energize said second control relay when the frequency of said control signal reaches a second predetermined value greater than said first predetermined value; additional circuit means interconnecting said second control means and said second utilization relay for energizing said second utilization relay when said second control relay is energized; alternate circuit means operatively connected to said first and second control means for deenergizing said first control relay when said second control relay is energized, said alternate circuit means also being operatively connected to said first utilization relay for maintaining said first utilization relay energized after said first control relay is deenergized; said first control means being adapted, after the second control relay is energized, to energize said first control relay a second time when the frequency of said control signal attains a third predetermined value greater than said second predetermined value; and further circuit means interconnecting said first control means, second control means, and third utilization relay for energizing said third utilization relay when said first control relay is energized said second time.

29. A relay control circuit of the type in which a plurality of utilization relays are sequentially operated in response to successive discrete changes in a control signal applied to the circuit, comprising, in combination: first, second, third, fourth, and fifth utilization relays; first control relay means including a first control relay, adapted to have said control signal applied thereto and to energize said first control relay a first time when said control signal attains a first predetermined amplitude; circuit means interconnecting said first control relay means and said first utilization relay for energizing said first utilization relay when said first control relay is energized said first time; second control relay means including a second control relay, adapted to have said control signal applied thereto and to energize said second control relay a first time when said control signal attains a second predetermined amplitude greater than said first predetermined amplitude; additional circuit means interconnecting said second control relay means and said second utilization relay for energizing said second utilization relay when said second control relay is energized a first time; third control relay means including a third control relay, adapted to have said control signal applied thereto and to energize said third control relay when said control signal attains a third predetermined amplitude greater than said second predetermined amplitude; other circuit means interconnecting said third control relay means and said third utilization relay for energizing said third utilization relay when said third control relay is energized; alternate circuit means operatively connected to all said first, second, and third control relay means for deenergizing said first and second control relays when said third control relay is energized, said alternate circuit means also being operatively connected to said first and second utilization relays for maintaining said first and second utilization relays energized after said first and second control relays are deenergized; said first control relay means being adapted, after the third control relay is energized, to energize said first control relay a second time when said control signal attains a fourth predetermined amplitude greater than said third predetermined amplitude; further circuit means interconnecting said first control relay means, third control relay means, and fourth utilization relay for energizing said fourth utilization relay when said first control relay is energized a second time; said second control relay means being adapted, after the third control relay is energized, to energize said second control relay a second time when said control signal attains a fifth predetermined amplitude greater than said fourth predetermined amplitude; and still further circuit means interconnecting said second control relay means, third control relay means, and fifth utilization relay for energizing said fifth utilization relay when said second control relay is energized said second time.

30. In a vehicle traction motor control system of the type wherein the vehicle traction motor is operatively connected to its source of power in a manner such that speed control of said motor may be effected, and in which a signal generator is operatively connected to the traction motor for generating a control signal having an amplitude proportional to the speed of the traction motor, in combination: first, second, and third utilization relays; circuit means including first, second, and third resistor means and the contacts of said first, second, and third utilization relays for connecting said source of power to the traction motor, the contacts of said first, second, and third utilization relays selectively connecting said first, second, and third resistor means respectively in and out of circuit to control the speed of said motor in accordance with the energization of said first, second, and third utilization relays; first control relay means including a first control relay, adapted to have said control signal applied thereto and to energize said first control relay a first time when said control signal attains a first predetermined amplitude; other circuit means interconnecting said first control relay means and said first utilization relay for energizing said first utilization relay when said first control relay is energized the first time; second control relay means including a second control relay, adapted to have said control signal applied thereto and to energize said second control relay when said control signal attains a second predetermined amplitude greater than said first predetermined amplitude; additional circuit means interconnecting said second control relay means and said second utilization relay for energizing said second utilization relay when said second control relay is energized; alternate circuit means operatively connected to said first and second control relay means for deenergizing said first control relay when said second control relay is energized, said alternate circuit means also being operatively connected to said first utilization relay for maintaining said first utilization relay energized after said first control relay is deenergized; said first control relay means being adapted, after the second control relay is energized, to energize said first control relay a second time when said control signal attains a third predetermined amplitude greater than said second predetermined amplitude; and further circuit means interconnecting said first control relay means, second control relay means, and third utilization relay for energizing said third utilization relay when said first control relay is energized said second time.

31. In a vehicle traction motor control system of the type in which a vehicle traction motor is operatively connected to its source of power in a manner such that speed control of said motor may be effected, and in which a signal generator operatively connected to the traction motor is employed to generate an alternating current control signal having a frequency proportional to the speed of the traction motor, in combination: first, second, and third utilization relays; circuit means including first, second, and third resistor means and the contacts of said first, second, and third utilization relays for connecting said source of power to the traction motor, the contacts of said first, second, and third utilization relays selectively connecting said first, second, and third resistor means respectively in and out of circuit to control the speed of said traction motor in accordance with the energization of said first, second, and third utilization relays; first control means including first alternating current frequency selective means and a first control relay, adapted to have said control signal applied thereto and to energize said first control relay a first time when the frequency of said control signal reaches a first predetermined value; other circuit means interconnecting said first control means and said first utilization relay for energizing said first utilization relay when said first control relay is energized said first time; second control means including second alternating current frequency selective means and a second control relay, adapted to have said control signal applied thereto and to energize said second control relay when the frequency of said control signal reaches a second predetermined value greater than said first predetermined value; additional circuit means interconnecting said second control means and said second utilization relay for energizing said second utilization relay when said second control relay is energized; alternate circuit means operatively connected to said first and second control means for deenergizing said first control relay when said second control relay is energized, said alternate circuit means also being operatively connected to said first utilization relay for maintaining said first utilization relay energized after said first control relay is deenergized; said first control means being adapted, after the second control relay is energized, to energize said first control relay a second time when the frequency of said control signal attains a third predetermined value greater than said second predetermined value; and further circuit means interconnecting said first control means, second control means, and third utilization relay for energizing said third utilization relay when said first control relay is energized said second time.

References Cited in the file of this patent
UNITED STATES PATENTS

| | | |
|---|---|---|
| 2,331,228 | Purifoy | Oct. 5, 1943 |
| 2,337,717 | Hines | Dec. 28, 1943 |